US012238848B2

(12) United States Patent
Rafac

(10) Patent No.: US 12,238,848 B2
(45) Date of Patent: Feb. 25, 2025

(54) EUV LIGHT SOURCE TARGET METROLOGY

(71) Applicant: ASML Netherlands B.V., Veldhoven (NL)

(72) Inventor: Robert Jay Rafac, Encinitas, CA (US)

(73) Assignee: ASML Netherlands B.V., Veldhoven (NL)

( * ) Notice: Subject to any disclaimer, the term of this patent is extended or adjusted under 35 U.S.C. 154(b) by 225 days.

(21) Appl. No.: 18/016,553

(22) PCT Filed: Jul. 23, 2021

(86) PCT No.: PCT/EP2021/070671
§ 371 (c)(1),
(2) Date: Jan. 17, 2023

(87) PCT Pub. No.: WO2022/023201
PCT Pub. Date: Feb. 3, 2022

(65) Prior Publication Data

US 2023/0300965 A1 Sep. 21, 2023

Related U.S. Application Data

(60) Provisional application No. 63/058,987, filed on Jul. 30, 2020, provisional application No. 63/212,793, filed on Jun. 21, 2021.

(51) Int. Cl.
*H05G 2/00* (2006.01)

(52) U.S. Cl.
CPC ............. *H05G 2/008* (2013.01); *H05G 2/003* (2013.01)

(58) Field of Classification Search
CPC ........ H05G 2/008; H05G 2/003; G01N 21/21; G01N 201/06113
See application file for complete search history.

(56) References Cited

U.S. PATENT DOCUMENTS 7,372,056 B2 5/2008 Bykanov et al.
7,599,069 B2 10/2009 Toussaint, Jr. et al.
8,158,960 B2 4/2012 Vaschenko et al.
(Continued)

FOREIGN PATENT DOCUMENTS

DE 102019209213 A1 12/2020
TW 201945792 A 12/2019
(Continued)

OTHER PUBLICATIONS

Christopher Smith, European International Searching Authority, International Search Report and Written Opinion, corresponding PCT Application No. PCT/EP2021/070671, mailed Oct. 15, 2020, 9 pages total.
(Continued)

*Primary Examiner* — Courtney D Thomas
(74) *Attorney, Agent, or Firm* — DiBerardino McGovern IP Group LLC

(57) ABSTRACT

Disclosed is an apparatus for and method of aligning a target composed of a target material and a conditioning beam provided to condition the target by changing the target's shape, mass distribution, etc., in which the conditioning beam includes structured light in the form of an inhomogeneous distribution of a propagation mode such as a polarization mode across a spatial mode of the target.

20 Claims, 20 Drawing Sheets

(56) References Cited

U.S. PATENT DOCUMENTS

| | | | | |
|---|---|---|---|---|
| 9,241,395 | B2 | 1/2016 | Senekerimyan et al. | |
| 9,497,840 | B2 | 11/2016 | Wehrens | |
| 10,048,199 | B1 | 8/2018 | Odle et al. | |
| 2008/0149862 | A1 * | 6/2008 | Hansson ................ | H05G 2/005 250/504 R |
| 2013/0119232 | A1 | 5/2013 | Moriya et al. | |
| 2022/0113240 | A1 | 4/2022 | Foertsch et al. | |

FOREIGN PATENT DOCUMENTS

| | | | |
|---|---|---|---|
| WO | 2014149435 | A1 | 9/2014 |
| WO | 2019192841 | A1 | 10/2019 |
| WO | 2020259889 | A1 | 12/2020 |

OTHER PUBLICATIONS

Stefan Berg-Johansen et al, "Classically entangled optical beams for high-speed kinematic sensing," Optica, vol. 2, No. 10, pp. 864-868 (2015).

Filippo Cardano et al., "Polarization pattern of vector vortex beams generated by q-plates with different topological charges," Appl. Opt. 51, C1-C6 (2012).

René Dándliker, "The concept of modes in optics and photonics," Sixth Int'l Conf. Educ. Training in Optics and Photonics, SPIE vol. 3831, pp. 193-198 (2000).

Xiao-Bo Hu et al., "In situ detection of a cooperative target's longitudical and angular speed using structured light," Optics Letters, vol. 44, No. 12, pp. 3070-3073 (2019).

Yuichi Kozawa et al., "Direct Generation of Cylindrical Vector Beam from Nd:YAG Laser Cavity," 2005 Pacific Rim Conference on Lasers & Electro-Optics, pp. 809-810 (2005), doi: 10.1109/CLEOPR.2005.1569552.

Priyanka Lochab et al., "Robust laser beam engineering using polarization and angular momentum diversity," Optics Express, vol. 25, No. 15, pp. 17524-529 (2017).

Carmelo Rosales-Guzmán et al., "A review of complex vector light fields and their applications," J. Opt. vol. 20, 123001 (2018), doi: 10.1088/2040-8986/aaeb7d.

"Semiconductor Processing Equipment", Research Disclosure, RD663039, vol. 663, No. 39, p. 723 (2019).

* cited by examiner

EUV LIGHT SOURCE TARGET METROLOGY

CROSS REFERENCE TO RELATED APPLICATIONS

This application claims priority to U.S. Application No. 63/058,987, filed Jul. 30, 2020, titled STRUCTURED BEAM FOR EUV LIGHT SOURCE TARGET CONDITIONING WITH FEATURE FOR SELF-MONITORING OF ALIGNMENT; and U.S. Application No. 63/212,793, filed Jun. 21, 2021, titled EUV LIGHT SOURCE TARGET METROLOGY, each of which are incorporated herein in their entireties by reference.

FIELD

The present disclosure relates to light sources which produce extreme ultraviolet light by excitation of a target material, in particular to the measurement, e.g., detection, of a target material in such sources.

BACKGROUND

Extreme ultraviolet ("EUV") light, for example, electromagnetic radiation having wavelengths of around 50 nm or less (also sometimes referred to as soft x-rays) and including light at a wavelength of about 13 nm, is used in photolithography processes to produce extremely small features in and on substrates, for example, silicon wafers.

Methods for generating EUV light include, but are not limited to, altering the physical state of the target material into a plasma state. The target material includes an element, for example, xenon, lithium, or tin, with an emission line in the EUV range. In one such method, often termed laser produced plasma ("LPP"), the required plasma is produced by irradiating a target material, for example, in the form of a droplet, stream, or cluster of target material, with an amplified light beam that can be referred to as a drive laser. For this process, the plasma is typically produced in a sealed vessel, for example, a vacuum chamber, and monitored using various types of metrology equipment.

$CO_2$ amplifiers and lasers, which output an amplified light beam at a wavelength of about 10600 nm, can present certain advantages as a drive laser for irradiating the target material in an LPP process. This may be especially true for certain target materials, for example, for materials containing tin. For example, one advantage is the ability to produce a relatively high conversion efficiency between the drive laser input power and the output EUV power.

In the EUV light source, EUV may be produced in a multi-step process in which a target, e.g., droplet is struck before reaching an irradiation site by one or more pulses that condition the target for ultimate phase conversion at the irradiation site. Conditioning in this context may include altering the shape of the droplet, e.g., flattening the droplet, or the distribution of the droplet, e.g., at least partially dispersing some of the droplet as a mist, or even partial phase change. For the purposes of this disclosure, these pulses which are preliminary to the main heating pulse are referred to as target-conditioning beams, regardless of whether produced by the main drive laser or another laser.

Also, as implied above, as a result of conditioning, the droplet of target material will undergo physical changes preliminary to being irradiated by the main pulse, including shape changes and mass distribution changes. Sometimes the mass of target material is referred to as a droplet before it is conditioned and as a target after it has been conditioned at least once. As used herein, "droplet" will refer to the mass of target material before any conditioning but target will refer to the mass of target material both before and after conditioning so that droplets are a type of target, unless the context indicates otherwise.

One objective in the efficient production of EUV light is attaining the proper relative positioning of the conditioning beam and the target. This is also referred to as aligning the conditioning beam and the target. It is generally important to align the target and the conditioning beam to within a few micrometers for efficient and debris-minimized operation of the light source. In general, the alignment state is determined by determining the position of the beam, determining the position of the target, and finding a difference. Thus, much effort has been devoted to determining a position of the targets. For example, U.S. Pat. No. 7,372,056, issued May 13, 2008, and titled "LPP EUV Plasma Source Material Target Delivery System," discloses the use of a droplet detection radiation source and a droplet radiation detector that detects droplet detection radiation reflected from a droplet of target material. U.S. Pat. No. 8,158,960, issued Apr. 17, 2012, and titled "Laser Produced Plasma EUV Light Source," discloses the use of a droplet position detection system which may include one or more droplet imagers that provide an output indicative of the position of one or more droplets, e.g., relative to the irradiation region. The imager(s) may provide this output to a droplet position detection feedback system, which can, e.g., compute a droplet position and trajectory, from which a droplet error can be computed. The droplet error may then be provided as an input to a controller, which can, for example, provide a position, direction and/or timing correction signal to the system to control a source timing circuit and/or to control a beam position and shaping system, e.g., to change the location and/or focal power of the light pulses being delivered to the irradiation region. See also U.S. Pat. No. 9,241,395, issued Jan. 19, 2016, and titled "System and Method for Controlling Droplet Timing in an LPP EUV Light Source," and U.S. Pat. No. 9,497,840, issued Nov. 15, 2016 and titled "System and Method for Creating and Utilizing Dual Laser Curtains from a Single Laser in an LPP EUV Light Source."

All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls.

In some systems, the conditioning pulse as reflected from the target is used to locate the target in space by collecting the reflected light and imaging it on a sensor. In other systems a secondary light source in addition to the conditioning pulse laser is used to illuminate the target, and a camera is positioned to image the illuminated target. This introduces the challenge that the measurement determines the position of the droplet relative only to the camera and not directly to the conditioning laser beam itself. Therefore, additional steps are required to relate the reference frame of the measurement system and the reference frame of the target-conditioning beam or heating laser. This has the disadvantage of trying to determine a small quantity as the difference between two relatively much larger quantities.

It is thus important to determine the relative positions of the conditioning laser beam and the target material that the laser beam is trying to hit. Existing technology measures the positions of the conditioning laser beam and the target separately, then takes the difference between the two large numbers to get a small number. As a result, the performance is subject to noise and optomechanical drifts between the subsystems measuring the two positions. At high frequencies, this renders the measurement outcome imprecise due to noise and, at low frequencies, inaccurate due to drifts.

There is therefore a need for a target beam alignment system which avoids these drawbacks.

SUMMARY

The following presents a concise summary of one or more embodiments in order to provide a basic understanding of the embodiments. This summary is not an extensive overview of all contemplated embodiments and is not intended to identify key or critical elements of all embodiments nor set limits on the scope of any or all embodiments. Its sole purpose is to present some concepts of one or more embodiments in a simplified form as a prelude to the more detailed description that is presented later.

According to one aspect of an embodiment there is disclosed an apparatus for and method of aligning a target and a conditioning beam in which the conditioning beam is caused to include structured light or radiation having an inhomogeneous property distribution such as polarization across and entangled with the transverse spatial mode, thus making it possible to recover information about the interaction of the target and the conditioning beam including a direct measurement of a position of the target material within the spatial mode of the conditioning beam. This involves only a single coordinate reference frame instead of translation between two reference frames which must be calibrated and matched.

Further embodiments, features, and advantages of the subject matter of the present disclosure, as well as the structure and operation of the various embodiments are described in detail below with reference to accompanying drawings.

Figure 1:
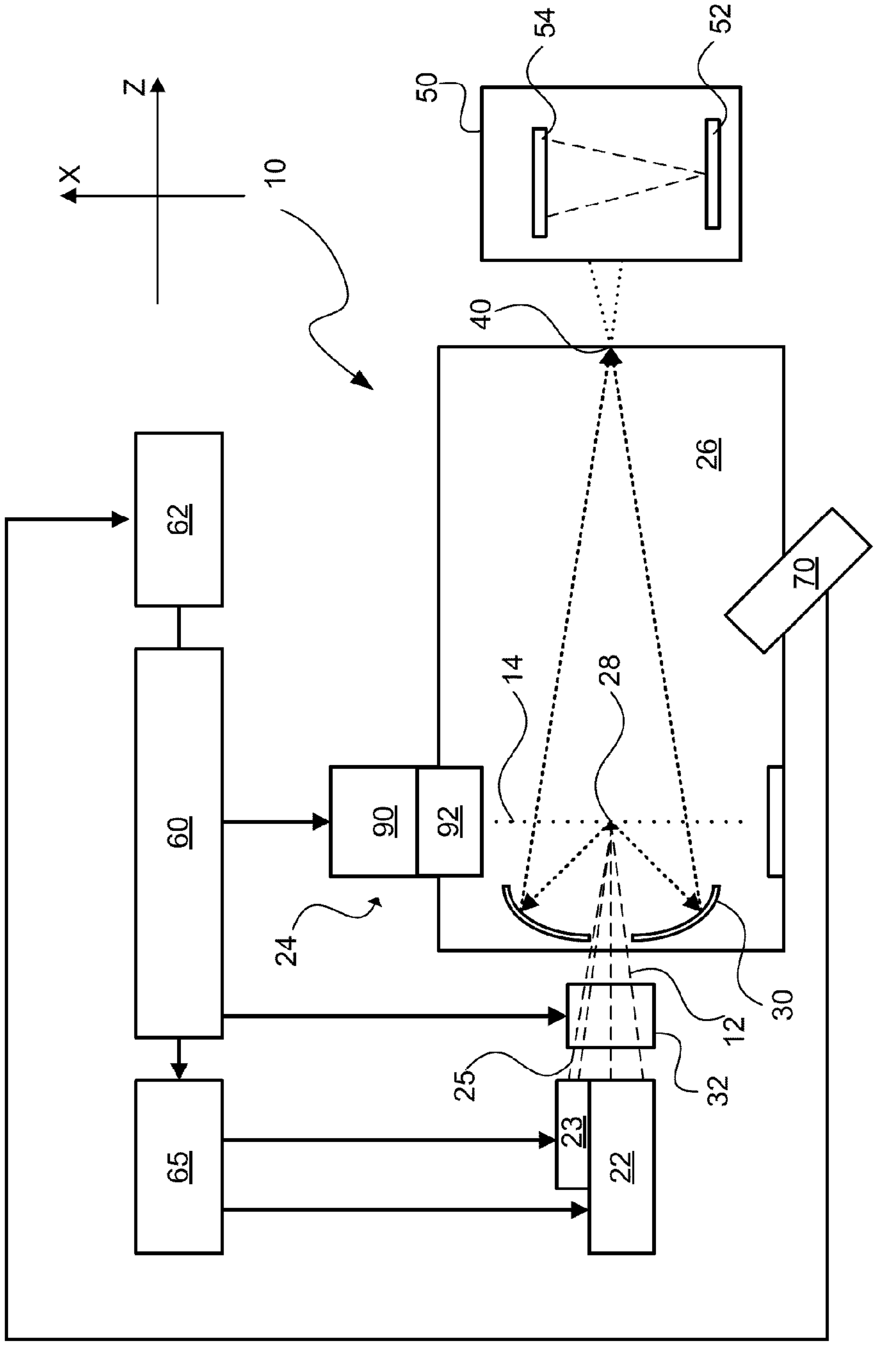
FIG. 1 is a schematic, not-to-scale view of an overall broad conception for a laser-produced plasma EUV radiation source system.

Further features and advantages of the disclosed subject matter, as well as the structure and operation of various embodiments of the disclosed subject matter, are described in detail below with reference to the accompanying drawings. It is noted that the applicability of the disclosed subject matter is not limited to the specific embodiments described herein. Such embodiments are presented herein for illustrative purposes only. Additional embodiments will be apparent to persons skilled in the relevant art based on the teachings contained herein.

DETAILED DESCRIPTION

Various embodiments are now described with reference to the drawings, wherein like reference numerals are used to refer to like elements throughout. In the following description, for purposes of explanation, numerous specific details are set forth in order to promote a thorough understanding of multiple embodiments. It may be evident in some or all instances, however, that any embodiment described below can be practiced without adopting the specific design details described below.

With initial reference to FIG. 1, there is shown a schematic view of an exemplary EUV radiation source, e.g., a laser produced plasma EUV radiation source 10 according to one aspect of an embodiment of the presently disclosed subject matter. As shown, the EUV radiation source 10 may include a pulsed or continuous laser source 22, which may for example be a pulsed gas discharge $CO_2$ laser source producing a beam 12 of radiation at a wavelength generally below 20 μm, for example, in the range of about 10.6 μm or to about 0.5 μm or less. The pulsed gas discharge $CO_2$ laser source may have DC or RF excitation operating at high power and at a high pulse repetition rate. The EUV radiation source 10 may also include one or more modules such as conditioning laser 23 emitting a beam 25 of conditioning radiation as explained above.

The EUV radiation source 10 also includes a target delivery system 24 for delivering target material in the form of liquid droplets or a continuous liquid stream. In this example, the target material is a liquid, but it could also, for example, be a solid. The target material may be made up of tin or a tin compound, although other materials could be used. In the system depicted the target material delivery system 24 introduces droplets 14 of the target material into the interior of a vacuum chamber 26 to an irradiation region 28 where the target material may be irradiated to produce plasma. In some cases, an electrical charge is placed on the target material to permit the target material to be steered toward or away from the irradiation region 28. It should be noted that as used herein an irradiation region is a region where target material irradiation is to occur and is an irradiation region even at times when no irradiation is actually occurring. The EUV light source may also include a beam focusing and steering system 32.

In the system shown, the components are arranged so that the droplets 14 travel substantially horizontally. The direction from the laser source 22 towards the irradiation region 28, that is, the nominal direction of propagation of the beam 12, may be taken as the Z axis. The path the droplets 14 take from the target material delivery system 24 to the irradiation region 28 may be taken as the X axis. The view of FIG. 1 is thus normal to the XZ plane. Also, while a system in which the droplets 14 travel substantially horizontally is depicted, it will be understood by one having ordinary skill in the art the other arrangements can be used in which the droplets travel vertically or at some angle with respect to gravity between and including 90 degrees (horizontal) and 0 degrees (vertical).

The EUV radiation source 10 may also include an EUV light source controller system 60, which may also include a laser firing control system 65, along with the beam steering system 32. The EUV radiation source 10 may also include a detector such as a target position detection system which may include one or more droplet imagers 70 that generate an output indicative of the absolute or relative position of a target droplet, e.g., relative to the irradiation region 28, and provide this output to a target position detection feedback system 62.

The target position detection feedback system 62 may use the output of the droplet imager 70 to compute a target position and trajectory, from which a target error can be computed. The target error can be computed on a droplet-by-droplet basis, or on average, or on some other basis. The target error may then be provided as an input to the light source controller 60. In response, the light source controller 60 can generate a control signal such as a laser position, direction, or timing correction signal and provide this control signal to the laser beam steering system 32. The laser beam laser beam steering system 32 can use the control signal to change the location and/or focal power of the laser beam focal spot within the chamber 26. The laser beam steering system 32 can also use the control signal to change the geometry of the interaction of the beam 12 and the droplet 14. For example, the beam 12 can be made to strike the droplet 14 off-center or at an angle of incidence other than directly head-on.

As shown in FIG. 1, the target material delivery system 24 may include a target delivery control system 90. The target delivery control system 90 is operable in response to a signal, for example, the target error described above, or some quantity derived from the target error provided by the system controller 60, to adjust paths of the target droplets 14 through the irradiation region 28. This may be accomplished, for example, by repositioning the point at which a target delivery mechanism 92 releases the target droplets 14. The droplet release point may be repositioned, for example, by tilting the target delivery mechanism 92 or by shifting the target delivery mechanism 92. The target delivery mechanism 92 extends into the chamber 26 and is preferably externally supplied with target material and a gas source to place the target material in the target delivery mechanism 92 under pressure.

Continuing with FIG. 1, the radiation source 10 may also include one or more optical elements. In the following discussion, a collector 30 is used as an example of such an optical element, but the discussion applies to other optical elements as well. The collector 30 may be a normal incidence reflector, for example, implemented as a multilayer mirror (MLM) fabricated by depositing many pairs of Mo and Si layers on a substrate with additional thin barrier layers, for example BC, ZrC, $Si_3N_4$ or C, deposited at each interface to effectively block thermally-induced interlayer diffusion. The collector 30 may be in the form of a prolate ellipsoid, with a central aperture to allow the laser radiation 12 to pass through and reach the irradiation region 28. The collector 30 may be, e.g., in the shape of an ellipsoid that has a first focus at the irradiation region 28 and a second focus at a so-called intermediate point 40 (also called the intermediate focus 40) where the EUV radiation may be output from the EUV radiation source 10 and input to, e.g., an integrated circuit lithography scanner or stepper 50 which uses the radiation, for example, to process a silicon wafer workpiece 52 in a known manner using a reticle or mask 54. The silicon wafer workpiece 52 is then additionally processed in a known manner to obtain an integrated circuit device.

Figure 2:
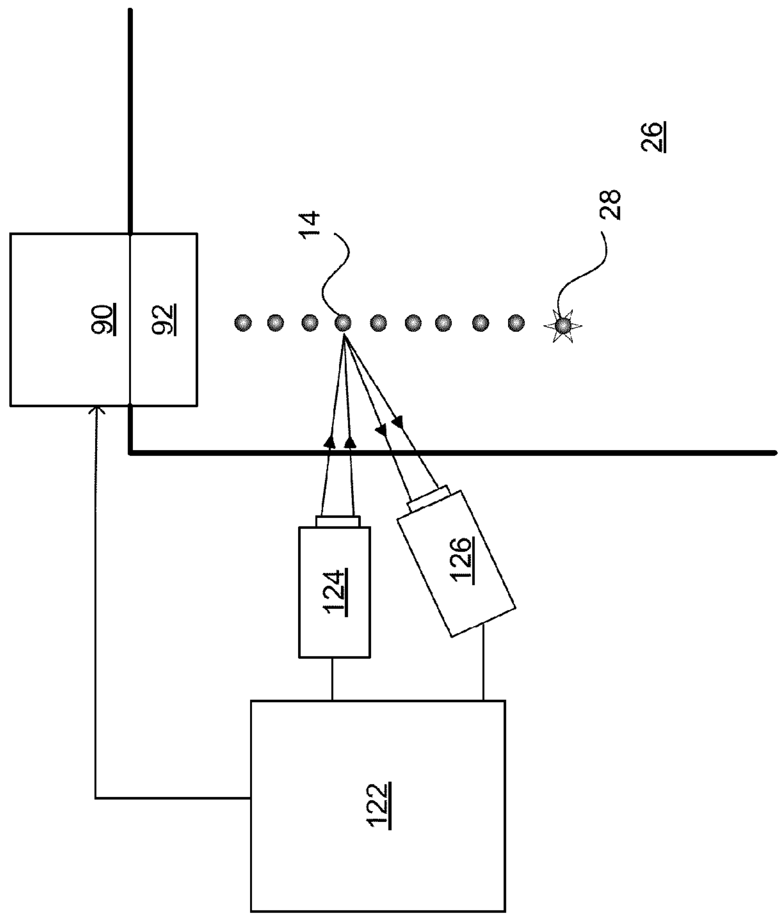
FIG. 2 is a schematic, not-to-scale view of a target material metrology system.

As mentioned, one droplet detection metrology utilizes darkfield illumination, where the backscatter from a target passing through a laser curtain is collected near the primary focus. The metrology device detects the droplet crossing at a specific location in space to provide a trigger to the system controls to enable all ensuing sequences to generate EUV. This is shown schematically in FIG. 2, in which a droplet detection controller 122 causes a droplet illumination module 124 to illuminate a droplet 14. A droplet detection module 126 detects the radiation backscattered by the droplet to permit the droplet detection controller 122 to determine the position of the droplet 14.

Figure 3A:
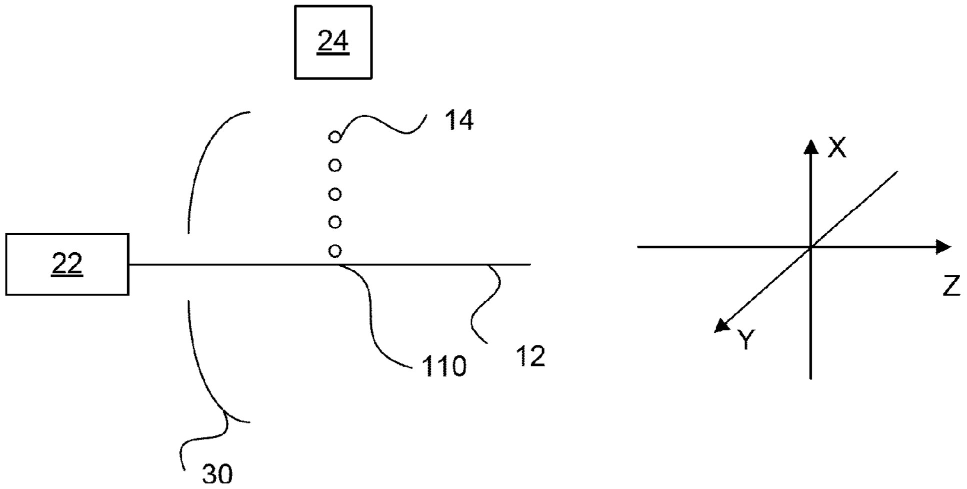
FIGS. 3A and 3B are diagrams illustrating certain targeting principles in a system such as that shown in FIGS. 1 and 2.

Also as mentioned, in general, for a reference coordinate system, as shown in FIG. 3A, Z is the direction along which the laser beam 12 propagates and is also the direction from the collector 30 to the irradiation site 110 and the EUV intermediate focus. X is in the droplet propagation plane. Y is orthogonal to the XZ plane. To make this a right-handed coordinate system, the trajectory of the droplets 14 is taken to be in the −X direction.

Figure 3B:
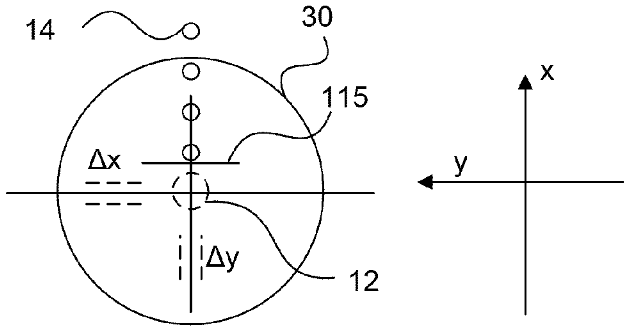

The primary components of targeting alignment error are ΔX and ΔY as shown in FIG. 3B. These errors typically need to be kept to less than about 5 μm. Errors in the Z-direction are less critical because the Rayleigh length of the laser focus is relatively long, so 100 μm or worse is tolerable.

The X position error ΔX is mostly a consequence of timing error, that is, timing of laser firing, assuming constant droplet velocity. Timing error correction can be accomplished fairly well by detecting the time at which the droplet crosses a laser curtain 115 near the irradiation site 110 within the irradiation region. This measurement can be made even when the laser is operational because the laser curtain 115 is provided by a separate laser source and thus can always be on. Also, the measurement performed using the laser curtain 115 is relatively tolerant to misalignment in Y, Z because the curtain is made to be wide in the YZ plane. There remains a need, however, for improvement in determining ΔX and □Y.

To determine the (X,Y) error, (□X,ΔY), it is possible to use the reflection of a target conditioning beam 12 from the droplet 14 and a high-rate detector. The high rate detector may be any suitable type of detector such as, for example, an imaging detector or a quadrant detector. However, even with an imaging detector, it is only possible to measure the droplet position relative to the geometry of the imaging system and relative to the beam, as desired. If the target conditioning beam hits the droplet, the droplet scatters that light mostly isotropically in all directions which can be imaged on a camera. All that can be determined from this interaction, however, is that the pulse hit the droplet sufficiently to scatter some light and where a resulting image is located in the image plane of the imaging system. What is lacking is the precise position of the target conditioning beam in relation to the imaging system. This yields the droplet position from that measurement which must be combined with a second measurement of the positioning of the beam to obtain the position of the droplet within or with respect to, the beam, which is what is prone to error.

In principle, to measure the droplet Y position it is also possible use a separate illuminator like the laser curtain 115 used for the arrival time. This would require the use of a high frame-rate imaging 2D detector (camera) to resolve the position, whereas the arrival timing needs only a non-imaging scattered light detector.

According to an aspect of an embodiment, the above challenges are met by using structured light. Structured light refers to the ability to tailor (structure) light in some property such as amplitude, phase, and polarization and combine that property with the spatial properties of the beam in an inseparable sense ("classical entanglement"). For example, a traveling electromagnetic plane has E and B components. The addition of these components with various amplitude and phase weightings gives rise to polarization. At the same time, the magnitude of E at each point in the plane determines the transverse spatial mode. Vector states refer to those states where a polarization pattern is inhomogeneously distributed across the transverse spatial mode, in which the transverse spatial mode and polarization are classically entangled, i.e., non-separable. See C. Rosales-Guzmán et al., "A review of complex vector light fields and their applications," J. Opt. 20 123001 (2018). The non-separability of cylindrically polarized vector beams has been used to enable two-dimensional real-time sensing of fast-moving objects. These systems rely on the fact that the measured object disturbs the spatial dependency of the beam but not its polarization. The required information regarding the beam and the object is recovered by correlating the resulting spatial modulation with the global polarization state through the classically entangled mode structure of the beam.

A field E(ρ, z) in the Schmidt form has measurable Stokes parameters which can be written as $s_0$, $s_1$, $s_2$, and $s_3$. When an opaque object cuts across a nonuniformly polarized beam, the spatial and polarization patterns of the nonuniformly polarized beam vary with time according to the object's position, as described by its central coordinates. The measured values of the Stokes parameters can be regarded as solutions in a nonlinear algebraic system of four equations for two variables. Solving these equations yields information about the position of the object in the spatial mode of the beam, or if time-dependent measurements are available, the trajectory of the object through the spatial mode of the beam.

The mode converter referred to herein entangles the spatial polarization distribution(s) with the spatial mode(s) of the beam. It does not simply imprint a polarization structure on top of an input beam, but instead converts the input mode to some other spatial distribution of EM fields.

Figure 4A:
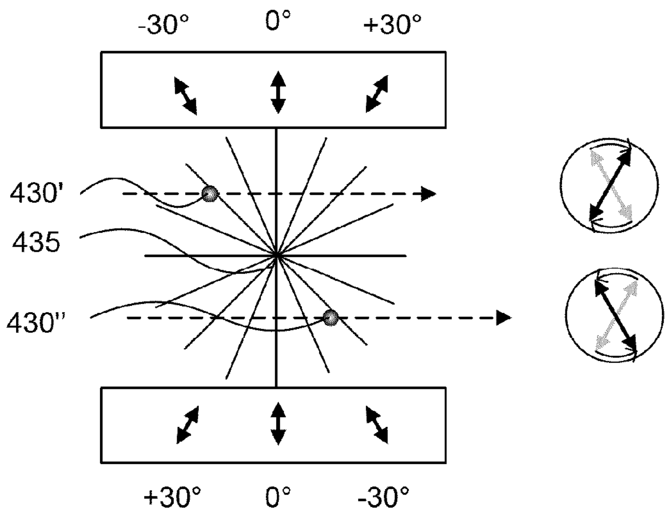
FIG. 4A is a diagram illustrating certain principles of operation of a target/conditioning beam alignment system according to one aspect of an embodiment.

If only linear polarization diversity is used to locate the target within the conditioning beam, the mirror-image degeneracy inherent in the Stokes parameter measurement prevents determining the position unambiguously. If it is assumed that the interaction occurs in the X, Y plane, both the X and Y positions of the targets at any time are ambiguous until enough information is obtained about the trajectory to permit a determination of which region the target is actually traversing. For example, in FIG. 4A, the target 430' and the target 430" will in the instant depicted both provide reflected radiation having the same polarization direction and magnitude. The lines radiating out represent the polarization direction, with the understanding that the magnitude of the polarization is a function of radius and goes to zero at the center of the beam.

One way to resolve the ambiguity is by using a continuous wave (CW) laser (which is some applications can instead be a quasi-continuous laser) to obtain a time series measurement and then use the time dependence of the Stokes parameters to determine position. For the case of a radially polarized continuous beam, the interaction of the beam and the target may be conceptualized as shown in in FIG. 4A. The polarization of the interacted light rotates from negative to positive angles as shown in the insets when the target 430' crosses one half (e.g., the upper half) of a radially polarized beam 435 travelling orthogonal to the plane of the figure. On the other hand, the polarization of the interacted light rotates from positive to negative angles when the target 430" crosses the other half (e.g., the lower half) of the radially polarized beam 435. In other words, if the target 430' crosses the beam 435 from left to right in the upper half of the beam 435, over time first the angle of the polarization axis of the interacted light will be negative, then zero, then positive. If the target crosses in the lower half, the time evolution of the interacted polarization will be the opposite first positive then zero then negative. This information can be used to break the degeneracy and provide an unambiguous determination of target position relative to the beam.

In this specification including description of all embodiments and in the claims, terms such as interacted light or interacted beam refer to the light or a beam that has interacted with the target by, for example, obscuration, reflection, or scattering, in a way that alters the polarization structure of the beam. The term scattering may also be used generically to refer to interactions other than classical scattering.

Figure 5A:
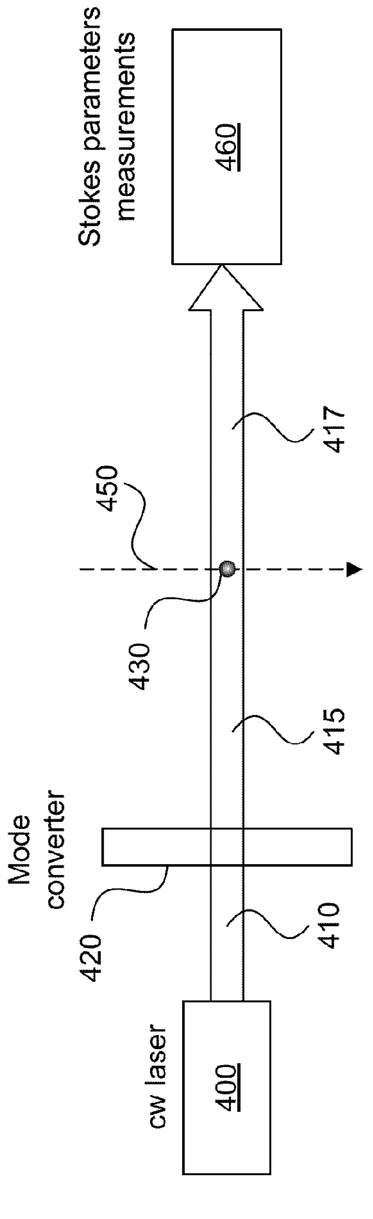
FIG. 5A is a not-to-scale schematic diagram illustrating certain principles of operation of a target/conditioning beam alignment system according to one aspect of an embodiment.

FIG. 5A shows a system exploiting these principles. In FIG. 5A, a continuous wave laser 400 emits a beam 410. A mode converter 420 prepares the beam 410 in a radially polarized mode to form a converted beam 415. The mode converter 420 as well as the other mode converters disclosed herein may be any suitable device for imposing an entangled polarization state on the spatial mode of the beam. The mode converter may be, for example, be a liquid crystal mode converter, a fused silica waveplate (s waveplate for radial or azimuthal polarization conversion) or a q plate (to generate light beams with orbital angular momentum of light (OAM) from a beam with well-defined spin angular momentum of light (SAM) comprised of, for example, liquid crystals, polymers or sub-wavelength gratings). The beam 415 strikes and interacts with a target 430 travelling along a trajectory 450. The motion of the target 430 modulates the Stokes parameters of the ongoing beam 417. A polarization measurement module 460 divides the ongoing beam 417 for projection onto its linear polarization components in a known manner. The projections are simultaneously measured. The beam's Stokes parameters as they evolve over time are obtained by linear combination of the projection signals, allowing the instantaneous trajectory of the target 430 to be reconstructed.

In the embodiment of FIG. 5A, the mode converter 420 is positioned in the beam path between the CW (or quasi-continuous) laser 400 and the target 430. In other words, the mode converter 420 is external to the CW laser 400. In accordance with another aspect of an embodiment, the mode converter can be positioned inside of the CW laser 400. This is shown in FIG. 5B, in which the mode converter 420 is positioned within the CW laser 400, for example, in the optical cavity of the CW laser 400.

Figure 5B:
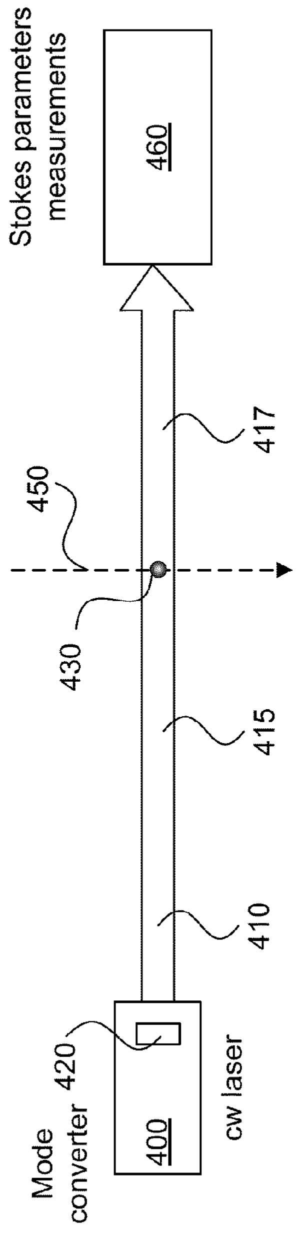
FIG. 5B is a not-to-scale schematic diagram illustrating certain principles of operation of a target/conditioning beam alignment system according to one aspect of an embodiment.
Figure 5C:
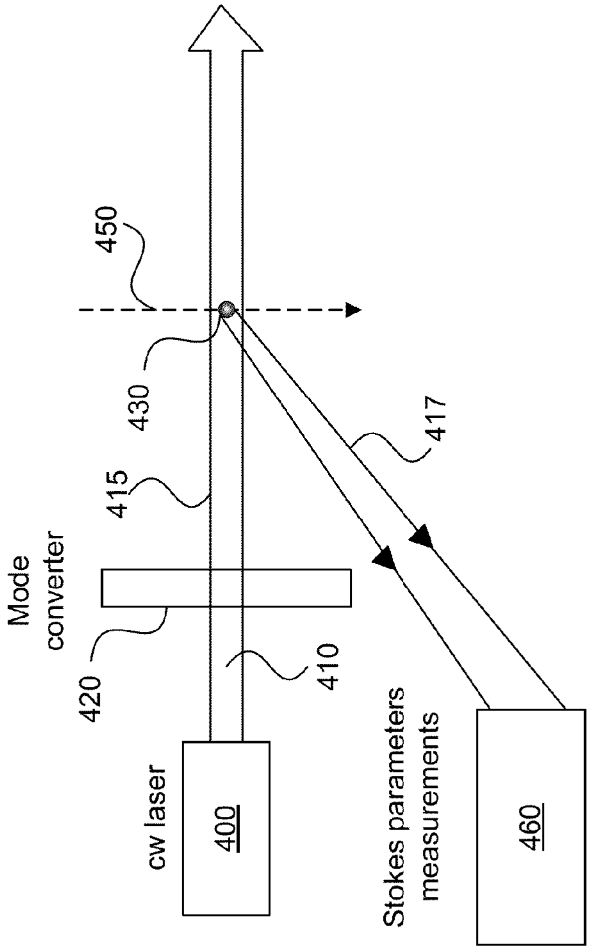
FIG. 5C is a not-to-scale schematic diagram illustrating certain principles of operation of a target/conditioning beam alignment system according to one aspect of an embodiment.

The arrangements of FIGS. 5A and 5B use a bright field arrangement in which light which has interacted the target 430 reaches the polarization measurement module 460. The system can also be implemented using dark field illumination in which the polarization measurement module 460 is arranged to receive radiation 417 reflected from or scattered by the target 430. Such an arrangement is shown in FIG. 5C.

The time evolution of the signal thus provides information on the path of the target through the beam. To take advantage of this without introducing an additional frame of reference of a separate metrology beam, according to one embodiment, a continuous beam is piggybacked on (i.e., made collinear with) a conditioning beam. The interaction of the beam with the target provides direct information about the offset of the target from the beam and can be used to control the alignment of the beam to the target thus optimizing the target conditioning process. The polarization of the interacted light provides a direct measurement of the alignment, not an indirect measurement. Measurement of the changes caused by interaction with the target needs only a polarization analyzer and a pair of "bucket" photodetectors, e.g., simple photodiodes. See S. Berg-Johansen et al., "Classically entangled optical beams for high-speed kinematic sensing," Optica 2, 864-868 (2015).

Figure 6A:
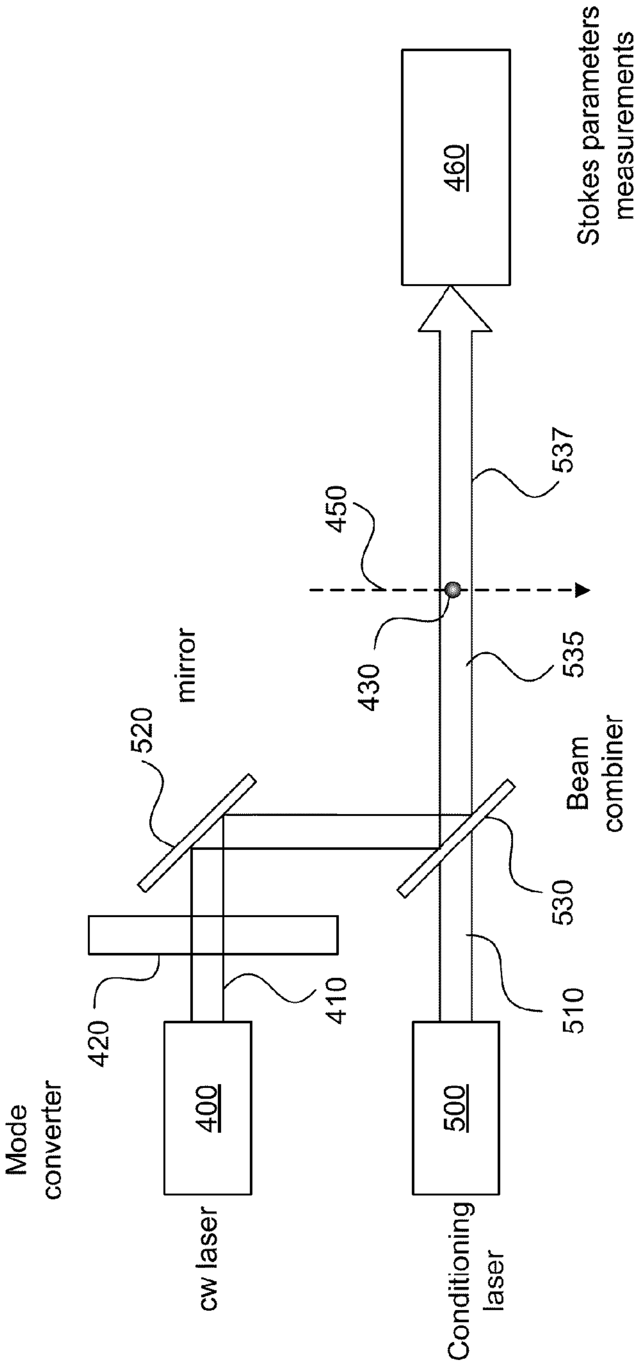
FIG. 6A is a not-to-scale schematic diagram of a target/conditioning beam alignment system according to one aspect of an embodiment.

Thus, according to an aspect of an embodiment, as shown in FIG. 6A, a beam 410 is converted to a structured beam by mode converter 420 and made to be collinear with a conditioning beam 510 from laser source 500 by a mirror 520 and beam combiner 530 in a known fashion. In this sense, structured light is added or introduced to the conditioning beam 510. The combined overlapping beam 535 interacts with the target 430 which is travelling along trajectory 450 to create forward going beam 537 which includes beam 520 as altered by the interaction with the target 430. In other words, the motion of the target 430 modulates the Stokes parameters of the beam 520 component of the beam 537. A polarization measurement module 460 measures the Stokes parameters of the beam 520 component of the beam 537 by dividing the beam 520 component for projection onto its linear polarization components in a known manner permitting recovery of the trajectory of the target 430 through the combined beam 535.

In the embodiment of FIG. 6A, the mode converter 420 is positioned in the beam path between the CW laser 400 and the target 430. In other words, the mode converter 420 is external to the CW laser 400. In accordance with another aspect of an embodiment, the mode converter can be positioned inside of the CW laser 400. This is shown in FIG. 6B, in which the mode converter 420 is positioned within the CW laser 400, for example, in the optical cavity of the CW laser 400.

In some applications it may be necessary or desirable to isolate the beam 520 component of the beam 537 in or before the polarization measurement module 460. Thus, in accordance with an aspect of an embodiment, the beam 520 may have a different wavelength than the beam 510, and the polarization measurement module 460 may be adapted to assess the polarization state only of light having the wavelength of beam 510. Alternatively or in addition the beam 520 may be slightly offset from the beam 510 in the path between the beam combiner 530 and the polarization measurement module 460, and the polarization measurement module 460 may be adapted to assess the polarization state only of the light in the location of the beam 520 (spatial separation). Alternatively or in addition the polarization measurement module 460 may be adapted to assess the polarization state of the beam 520 at a time when the pulsed beam 510 is not generating a pulse of light (temporal separation).

Figure 6B:
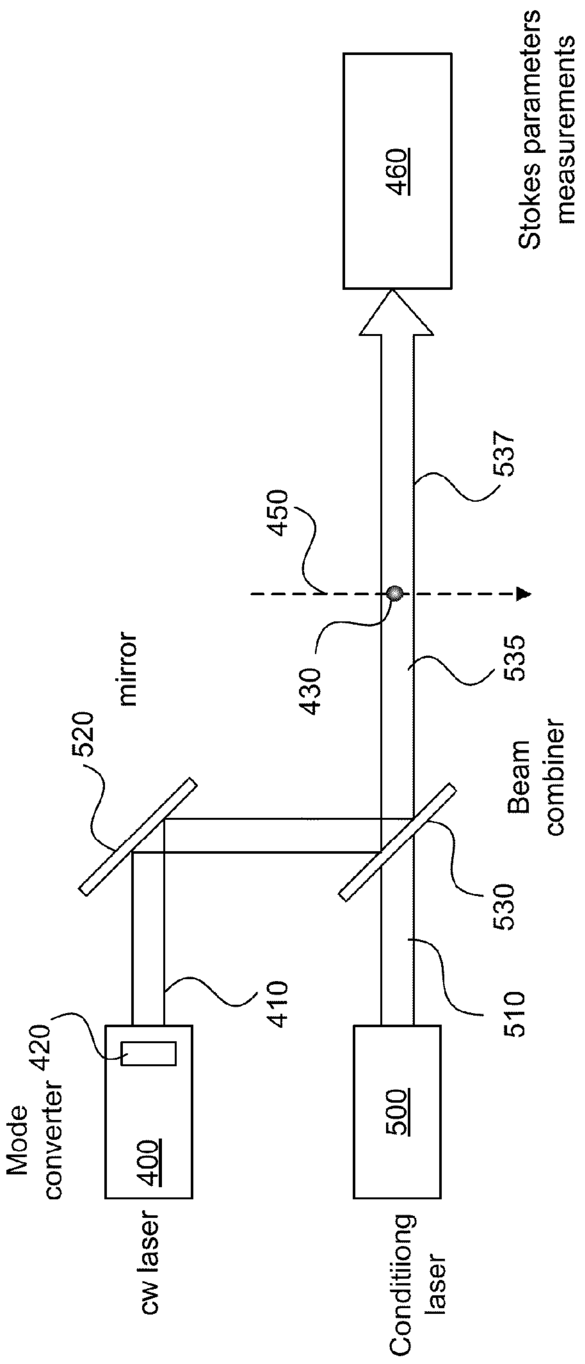
FIG. 6B is a not-to-scale schematic diagram of a target/conditioning beam alignment system according to one aspect of an embodiment.
Figure 6C:
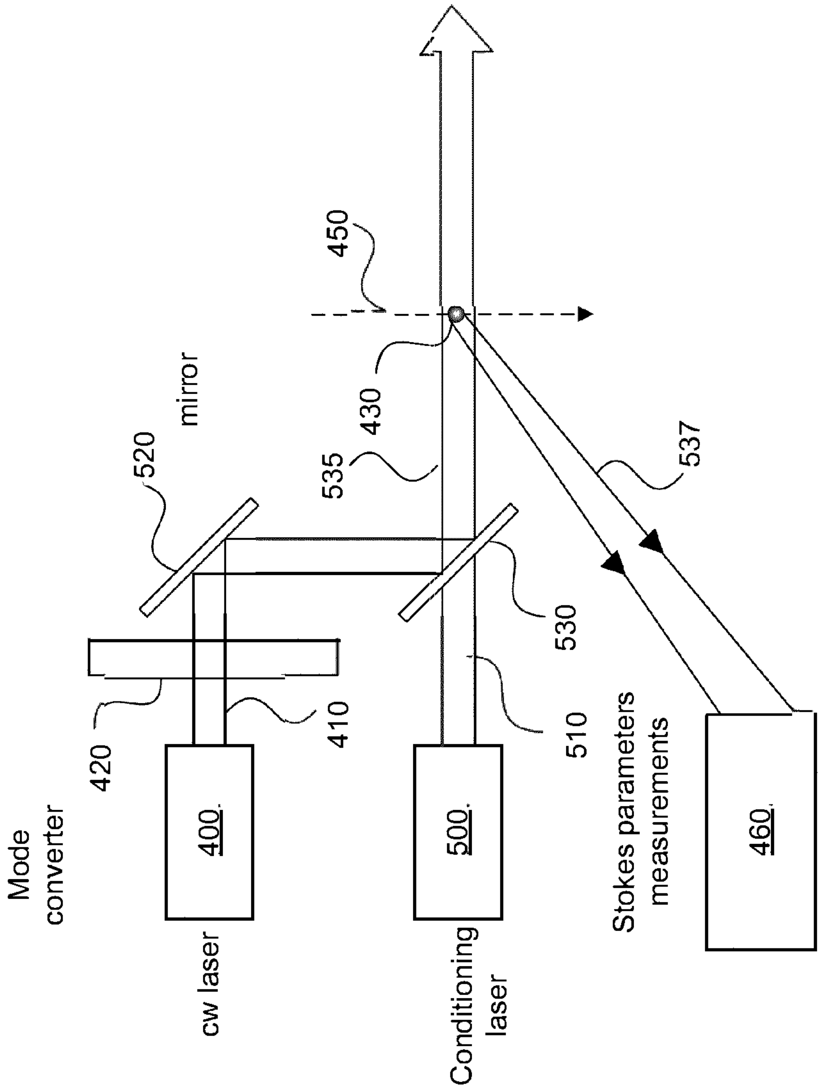
FIG. 6C is a not-to-scale schematic diagram of a target/conditioning beam alignment system according to one aspect of an embodiment.

The embodiments of FIGS. 6A and 6B use a bright field arrangement in which light as obscured by the target 430 reaches the polarization measurement module 460. The principles elucidated herein are also applicable to a dark field arrangement in which the polarization measurement module 460 is arranged to receive radiation that has interacted with the target 430. Such an arrangement is shown in FIG. 6C. Thus, according to an aspect of an embodiment, as shown in FIG. 6C, a beam 410 is converted to a structured beam by mode converter 420 and made to be collinear with a conditioning beam 510 from laser source 500 by a mirror 520 and beam combiner 530 in a known fashion. In this sense, structured light is added or introduced to the conditioning beam 510. The motion of the target 430 modulates the Stokes parameters of the beam 520 component of combined interacted beam 537. The polarization measurement module 460 measures the Stokes parameters of the beam 520 component of combined beam 537 by dividing the beam 520 component of combined beam 537 for projection onto its linear polarization components in a known manner permitting recovery of the trajectory of the target 430 through the combined beam 535. Again, to the extent necessary or desirable, wavelength or temporal separation may be used to isolate the beam 520 component of combined beam 537. Separation as necessary or desirable may also be employed in the other embodiments disclosed herein.

The pulses from a pulsed laser are in general too short to provide sufficient useful information on the target's trajectory to break the degeneracy of a linear polarization measurement. The analogy is a "movie" from a CW laser as opposed to a "snapshot" from the pulsed laser. With a time series being unavailable, one way to resolve the inherent ambiguity with a pulsed laser is to detect which of the degenerate regions the target is in using, for example, an imaging detector or wavelength diversity in the degenerate regions of the beam.

In other words, when using a pulsed laser, it is possible to determine at most only a partial trajectory which in general provides insufficient information about the rotation of the polarization vector to eliminate the ambiguity in target position. If in the single sample, one measures the polarization angle and a degree of polarization with it, then there is enough information to determine which if the two possible positions the target is occupying. If this process is taken as occurring in the X, Y plane, again X and Y are ambiguous at the same time. It is possible to collapse both of these ambiguities with another single measurement using, for example, an imaging detector accurate enough to indicate whether the target is right or left of center or above or below center. This is a sort of parity ambiguity of two possible positions +/−X and +/−Y. The additional measurement resolves this parity ambiguity.

Thus, according to another aspect of an embodiment, the vector character of the beam is used to sense two possible positions of the target relative to the mode structure of the beam, and a conventional imaging arrangement with a 1D or 2D array detector is used to remove the ambiguity of the instantaneous position relative to the mode structure of the beam.

Figure 7A:
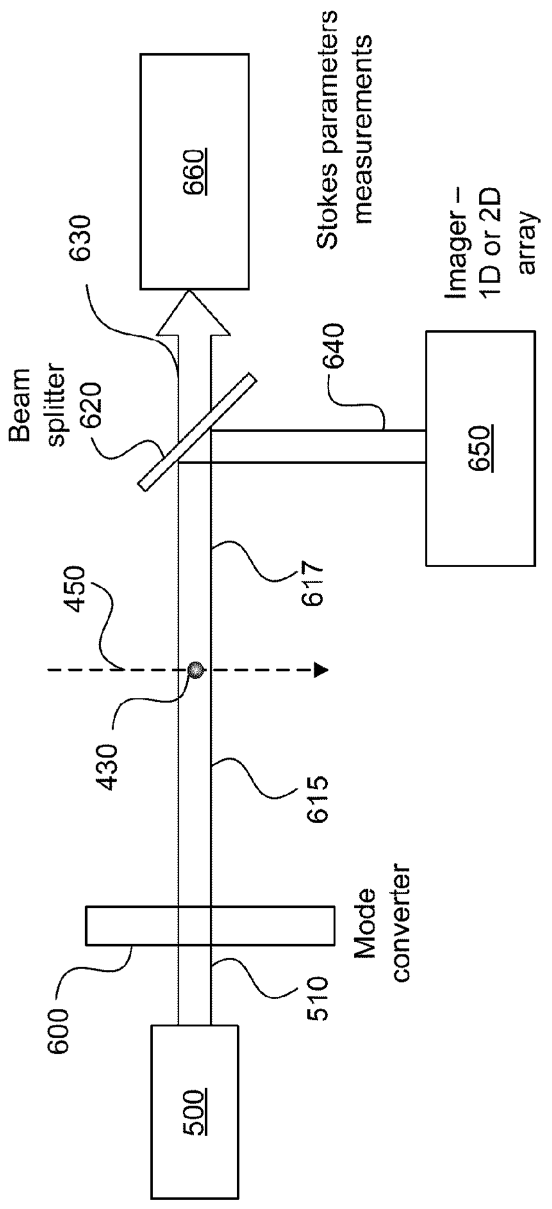
FIG. 7A is a not-to-scale schematic diagram of a target/conditioning beam alignment system according to one aspect of an embodiment.

FIG. 7A shows an arrangement in which a conditioning laser 500 emits a laser beam 510. The polarization mode of the laser beam 510 is converted by a mode converter 600. In this sense, structured light is added or introduced to the conditioning beam 510. The converted beam 615 interacts with the target 430. The converted, interacted beam 617 is then split by beam splitter 620 into beams 630 and 640. The Stokes parameters of the one part 630 of the split interacted beam 617 are measured by the polarization measurement module 660 to determine the position of the target 430 with a parity ambiguity. An imager 650 receives the other part 640 of the interacted and split light beam 617 to resolve the parity ambiguity of the instantaneous position of the target relative to the mode structure of the beam 615.

In the embodiment of FIG. 7A, the mode converter 600 is positioned in the beam path between the conditioning laser 500 and the target 430. In other words, the mode converter 600 is external to the conditioning laser 500. In accordance with another aspect of an embodiment, the mode converter can be positioned inside of the conditioning laser. This is shown in FIG. 7B, in which the mode converter 680 is positioned within the laser 670, for example, in the optical cavity of the laser 670.

Figure 7B:
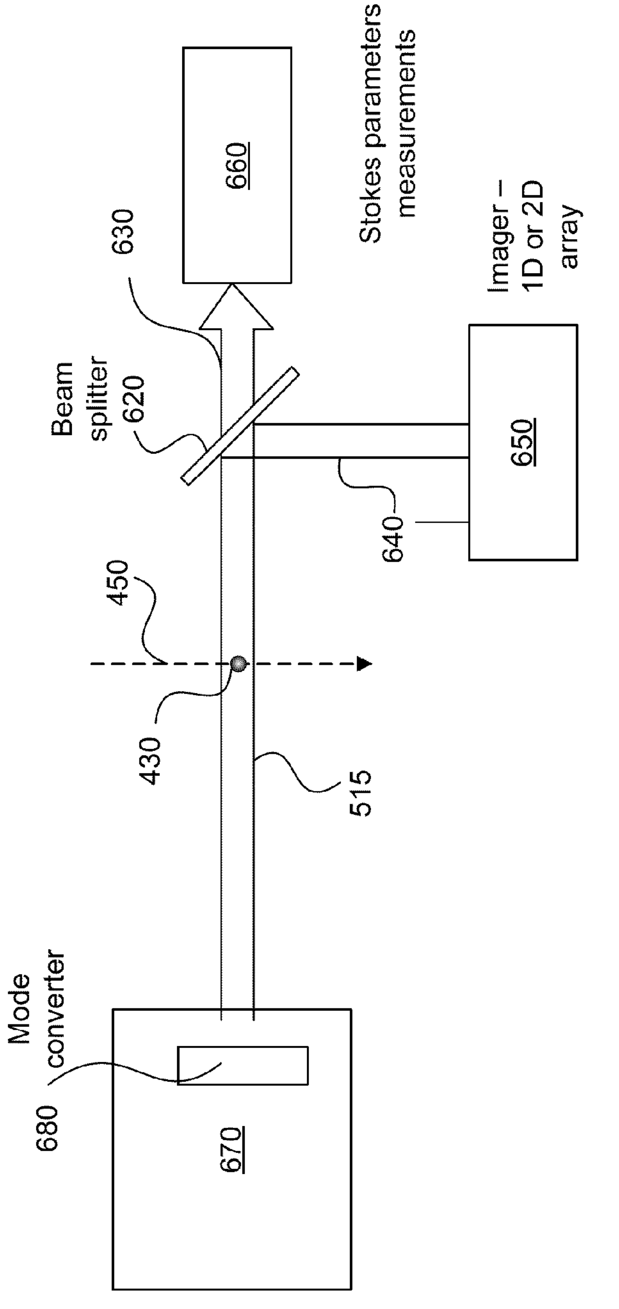
FIG. 7B is a not-to-scale schematic diagram of a target/conditioning beam alignment system according to one aspect of an embodiment.
Figure 7C:
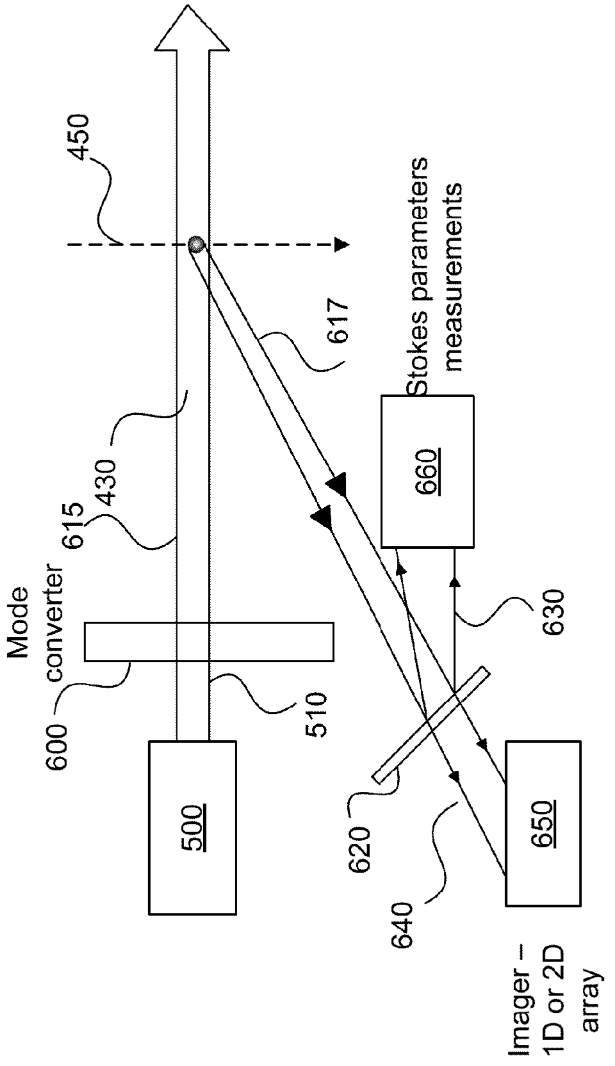
FIG. 7C is a not-to-scale schematic diagram of a target/conditioning beam alignment system according to one aspect of an embodiment.

Again, the embodiment of FIGS. 7A and 7B use a bright field arrangement in which light which has interacted with the target 430 reaches the polarization measurement module 660 and imager 650. The principles elucidated herein are also applicable to a dark field arrangement in which the polarization measurement module 660 and imager 650 are arranged to receive radiation reflected or scattered by the target 430. Such an arrangement is shown in FIG. 7C. The converted beam 615 interacts with the target 430. The beam splitter 620 is arranged to receive the reflected or scattered beam 617. The beam splitter 620 splits the converted, reflected, or scattered beam 615 into beams 630 and 640. The Stokes parameters of the one part 630 of the split reflected or scattered beam are measured by the polarization measurement module 660 to determine the position of the target with a parity ambiguity. An imager 650 receives the other part 640 of the scattered and split light beam to remove the ambiguity of the instantaneous position of the target relative to the spatial mode structure of the beam.

Figure 7D:
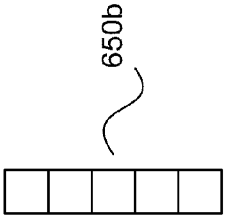
FIGS. 7D and 7E are diagrams of examples of imagers of possible use in the embodiments of FIGS. 7A-7C.
Figure 7E:
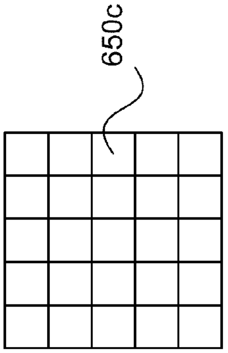

The imager 650 may be, for example, a one dimensional array such as one dimensional array 650*b* in FIG. 7D or a two dimensional array such as two dimensional array 650*c* in FIG. 7E.

Another way to resolve the inherent ambiguity when using a pulsed laser is by using a vector polarized beam which exploits the handedness of elliptical polarization to break that degeneracy. This approach uses an azimuthal vector beam with small circular/elliptical component. The position of the target allows distinguishing between up/down or right/left with respect to the beam center without using a transit timeseries (e.g., in a single pulse) by analyzing the handedness of the circular component. According to an aspect of an embodiment this is extended by using beams that have both vector and vortex diversity. Simultaneous polarization and angular momentum diversity with both vector and vortex character allows unambiguous association of a unique polarization state with any location in the mode. Orientation of polarization major axis distinguishes left from right, handedness distinguishes up from down. See P. Lochab et al., "Robust laser beam engineering using polarization and angular momentum diversity," Opt. Express 25, 17524-17529 (2017).

Figure 4B:
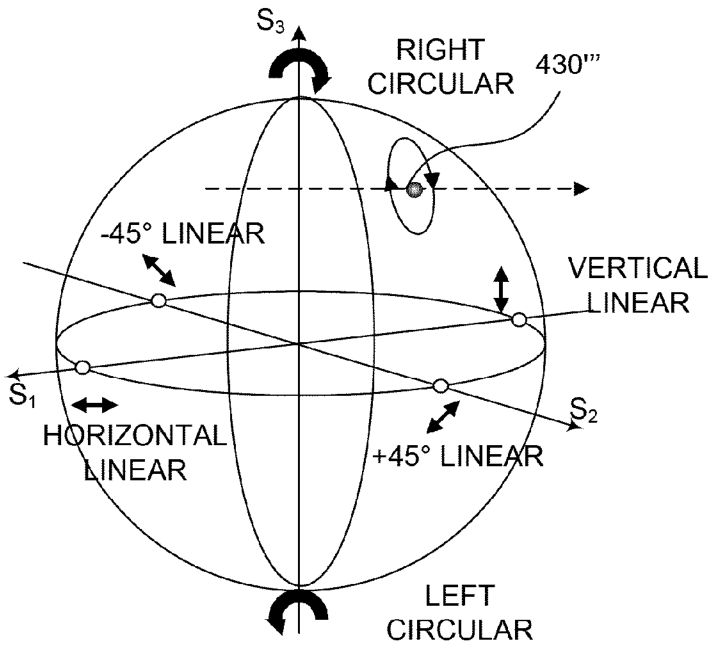
FIG. 4B is a diagram illustrating certain principles of operation of a target/conditioning beam alignment system according to one aspect of an embodiment.

Thus, as shown in FIG. 4B, polarization states are mapped to the Poincaré sphere using an approach similar to the system of latitude and longitude used to locate points on the Earth's globe. The coordinates of points across and within the Poincaré sphere are specified using two angular values (azimuth and ellipticity) and a radius. The azimuth and ellipticity parameters are taken from the polarization ellipse representation of the polarization state. The radius is determined by the light's degree of polarization. States mapped to the equator of the spherical surface are perfectly linearly polarized. States mapped to a value of ±1 on the s3 axis are circularly polarized. All elliptical polarization states that are not linearly or circularly polarized are mapped to other regions of the sphere. Thus, the light that has interacted with the target 430''' will be right elliptically polarized with a certain degree of ellipticity and tilt determined by its position.

A beam with both vector character and vortex, i.e., OAM, character is used to resolve the positional ambiguity in two dimensions. Measurement of the inclination of the interacted polarization ellipse determines the position of the target relative to the laser mode but with a parity ambiguity, and measurement of the handedness of the polarization removes the parity ambiguity in the position measurement by determining which of the two possible positions is correct.

Figure 8A:
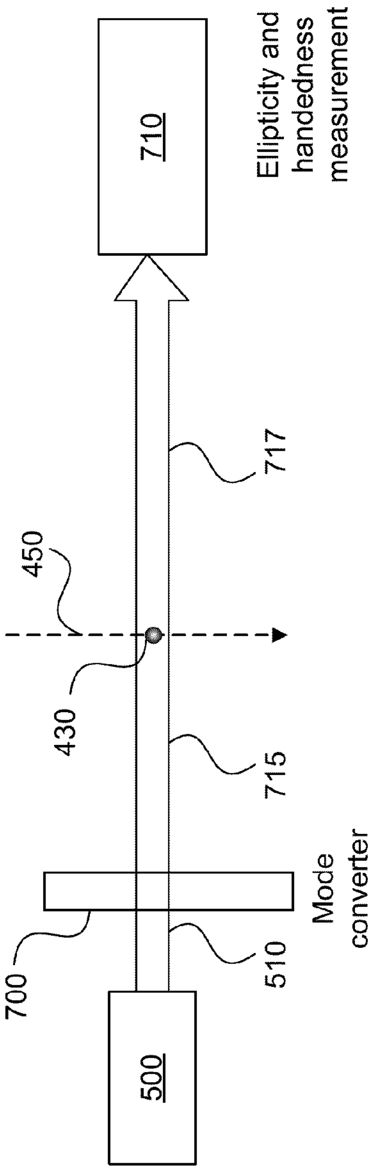
FIG. 8A is a not-to-scale schematic diagram of a target/conditioning beam alignment system according to one aspect of an embodiment.

In accordance with this approach, FIG. 8A shows a conditioning laser 500 emitting a beam 510. A mode converter 700 converts the beam 510 into a beam 715 having both polarization and angular momentum diversity. The converted beam 715 interacts with the target 430. An analyzer 710 arranged to receive the scattered beam 717 then determines orientation of polarization major axis to distinguish whether the target 430 was in the right or left hemisphere of the spatial mode of the beam 715 while using handedness of the angular momentum to determine whether the target 430 was in the right or left hemisphere of the entangled spatial mode of the beam 715.

In the embodiment of FIG. 8A, the mode converter 700 is positioned in the beam path between the conditioning laser 500 and the target 430. In other words, the mode converter 700 is external to the conditioning laser 500. In accordance with another aspect of an embodiment, the mode converter can be positioned inside of the conditioning laser. This is shown in FIG. 8B, in which the mode converter 720 is positioned within the laser 710, for example, in the optical cavity of the laser 710.

Figure 8B:
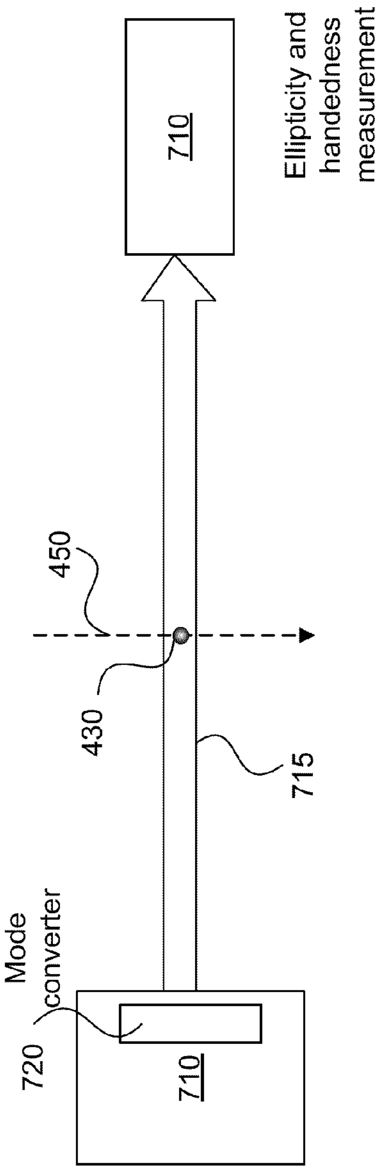
FIG. 8B is a not-to-scale schematic diagram of a target/conditioning beam alignment system according to one aspect of an embodiment.
Figure 8C:
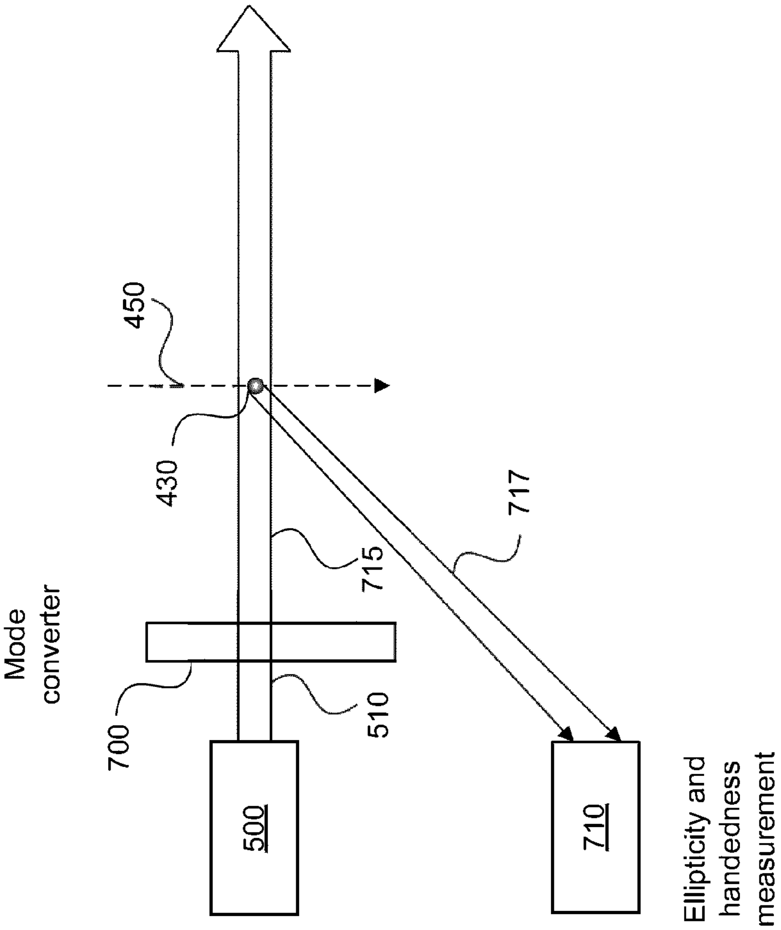
FIG. 8C is a not-to-scale schematic diagram of a target/conditioning beam alignment system according to one aspect of an embodiment.

Again, the embodiments of FIGS. 8A and 8B use a bright field arrangement in which light which has interacted with the target 430 reaches the analyzer 710. The principles elucidated herein are also applicable to a dark field arrangement in which the polarization measurement analyzer 710 is arranged to receive radiation backscattered by the target 430. Such an arrangement is shown in FIG. 8C.

Additionally, other variations are possible, e.g., using two-color vector beams for the conditioning beams to resolve the ambiguities when doing measurements with single-pulse illumination, or using hybrid approaches where a polarization-sensitive detector for a reverse scattered beam accomplishes part of the spatial discrimination with polarization and part using displacement of the spot.

The disclosed subject matter provides the possibility of using just two photodiodes instead of using full-frame cameras to examine the target shape and image processing to extract the image features that are sensitive to the beam-to-target alignment. Certain embodiments need at most two ports and even a single port for some schemes using light scattered at least partially in a direction opposite to the direction of the beam.

The disclosed subject matter provides a vector-beam approach to sense the position of targets in a beam that is used for both for metrology and target conditioning. It permits direct connection of the coordinate system of the conditioning beams because the metrology vector beam that provides the data for the alignment measurement is the same beam or is collinear with the beam that performs the conditioning action, giving a direct "laser-to-droplet" or "laser-to-target" measurement for control and optimization.

In arrangements in which multiple conditioning lasers or laser beams are used, such as a separate target conditioning beam and a separate pedestal beam, each can be provided with its own target/beam alignment system as set forth above.

Figure 9:
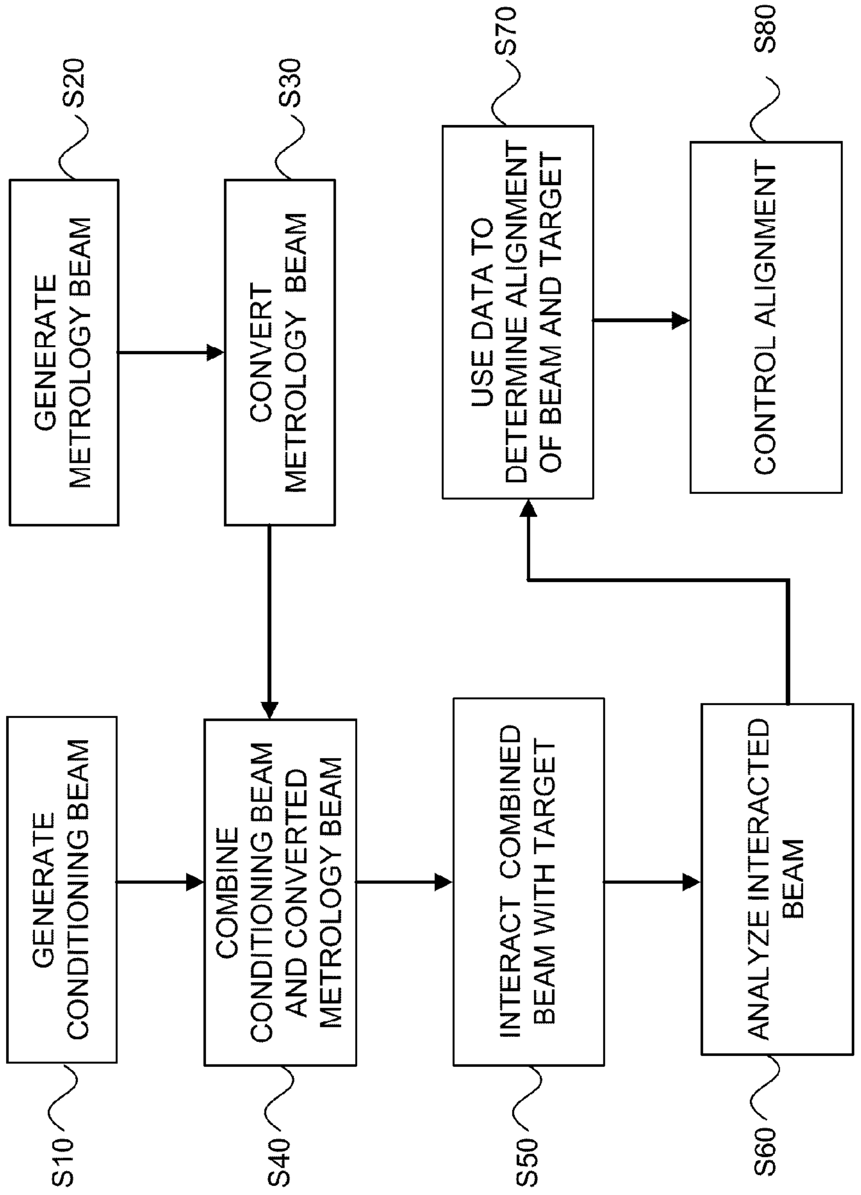
FIG. 9 is a flow chart showing a mode of operation of a target/conditioning beam alignment system according to one aspect of an embodiment.

FIG. 9 is a flow chart describing a procedure for aligning a target with a conditioning beam in accordance with one aspect of an embodiment. In a step S10 the conditioning beam is generated. At the same time, a metrology beam is generated in a step S20. This metrology beam is converted to a beam having structured radiation in a step S30. In a step S40, the conditioning beam and the converted metrology beam are combined, for example, by using a beam combiner. In a step S50, the combined beam is used to condition the target. That interaction also changes the polarization state of the structured radiation. In a step S60 the interacted beam is analyzed and, in a step S70, the data obtained from analysis of the interacted beam is used to determine the alignment between the conditioning beam and the target. In a step S80 the alignment of the conditioning beam and the target are controlled, for example, by bringing them into a desired state of alignment. This can be accomplished, for example, by supplying a control signal to the beam focusing and steering system 32 of FIG. 1.

Figure 10:
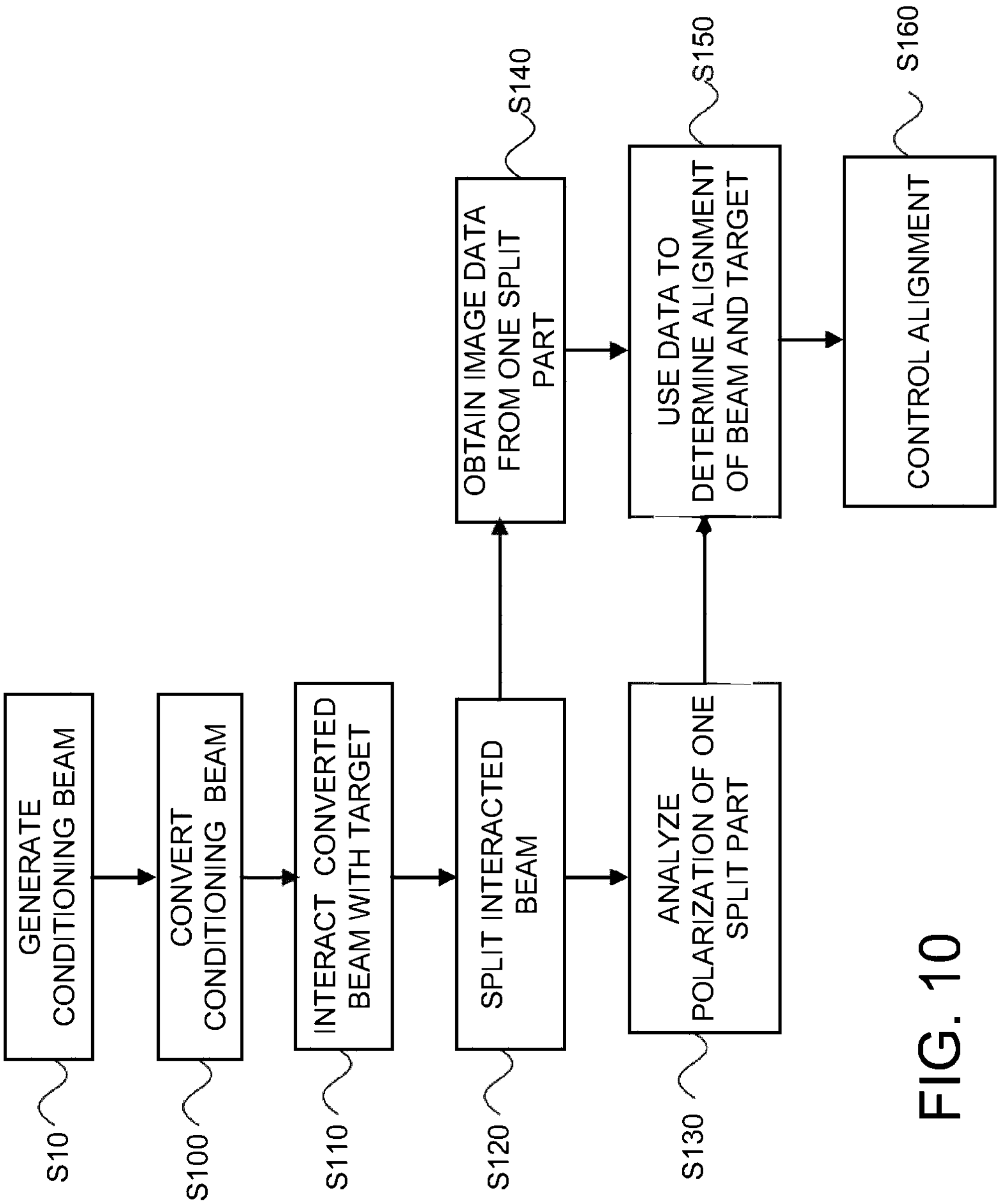
FIG. 10 is a flow chart showing a mode of operation of a target/conditioning beam alignment system according to one aspect of an embodiment.

FIG. 10 is also a flow chart describing a procedure for aligning a target with a conditioning beam in accordance with another aspect of an embodiment. As shown, in a step S10 the conditioning beam is generated. In a step S100 the conditioning beam is converted by changing a polarization mode of the beam in an inhomogeneous manner to obtain a structured beam. In a step S110, the structured converted beam is used to condition a target and the structured beam, or the structured portion of the beam, interacts with and is altered by the interaction. In a step S120 interacted beam is split. In a step S140 some or all of one of the beams resulting from the split is used as a source of image data, for example, one dimensional image data. In a step S130 the polarization of some or all of another beam resulting from the split is analyzed. In a step S150, the data obtained from the image analysis of step S140 and the polarization analysis of step S130 is used to determine the alignment of the conditioning beam and the target. In a step S160 the alignment of the conditioning beam and the target are controlled, for example, by bringing them into a desired state of alignment. This can be accomplished, for example, by supplying a control signal to the beam focusing and steering system 32 of FIG. 1.

Figure 11:
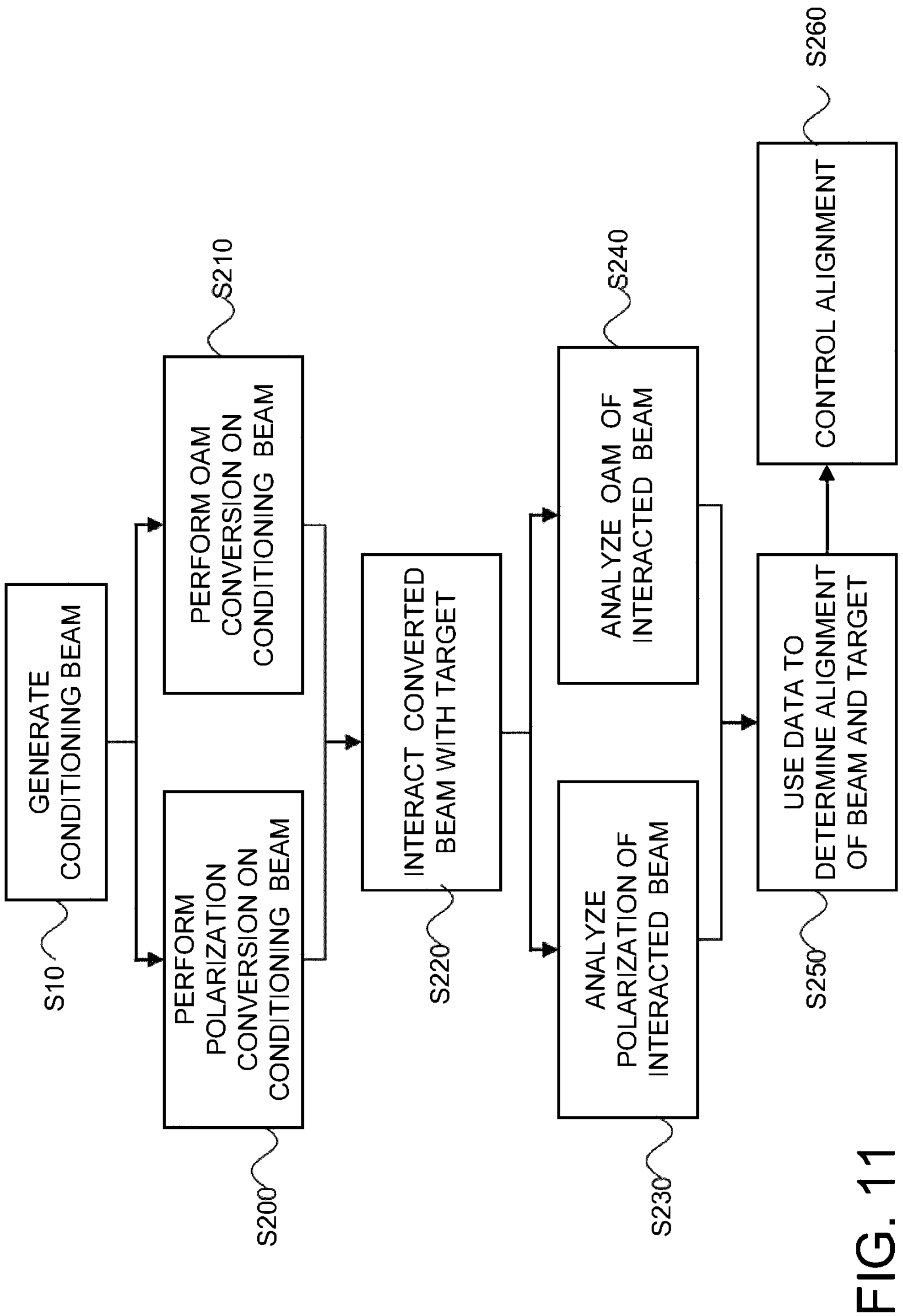
FIG. 11 is a flow chart showing a mode of operation of a target/conditioning beam alignment system according to one aspect of an embodiment.

FIG. 11 is also a flow chart describing a procedure for aligning a target with a conditioning beam in accordance with another aspect of an embodiment. As above, a conditioning beam is generated in a step S10. In steps S200 and S210, which may be performed in any order, a vector polarization conversion is performed (step S200) on the conditioning beam and an OAM (vortex polarization) conversion is performed (step 210) on the conditioning beam. These steps result in a structured beam having an inhomogeneous vector polarization and vortex polarization. In a step S220, the converted beam interacts with the target. Then, in steps 230 and 240, which may be performed concurrently or in any order, the polarization of the interacted beam is analyzed and the OAM of the interacted beam is analyzed, respectively. In a step S250 the data from the polarization analysis and the angular momentum analysis is used to determine the alignment of the beam and the target. In a step S260 the alignment of the conditioning beam and the target are controlled, for example, by bringing them into a desired state of alignment. This can be accomplished, for example, by supplying a control signal to the beam focusing and steering system 32 of FIG. 1.

The present disclosure is made the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. For example, control module functions can be divided among several systems or performed at least in part by an overall control system.

The above description includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is construed when employed as a transitional word in a claim. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The embodiments can be further described using the following clauses:

1. Apparatus for aligning a target of target material and a beam of conditioning radiation, the apparatus comprising:
   a source of structured conditioning radiation; and
   an analyzer arranged to receive a beam of the structured conditioning radiation produced from the beam of conditioning radiation after the beam of structured conditioning radiation has interacted with the target and adapted to analyze a polarization of the interacted structured conditioning radiation to determine an alignment of the target and the beam of structured conditioning radiation.
2. Apparatus as in clause 1 further comprising an alignment system for controlling an alignment of the source of structured condition radiation and the target based at least in part on the alignment determined by the analyzer.
3. Apparatus as in clause 2 wherein the alignment system comprises a beam steering system.
4. Apparatus as in clause 1 wherein the source of structured conditioning radiation comprises a laser system comprising a laser configured to generate the beam of conditioning radiation and a module arranged to receive the beam of conditioning radiation and configured to add structured radiation having a spatially inhomogeneous polarization distribution to the beam of conditioning radiation.
5. Apparatus as in clause 4 wherein the module comprises a metrology laser system configured to generate a beam of structured radiation having a spatially inhomogeneous polarization distribution and a beam combiner arranged to receive and combine the beam of conditioning radiation and the beam of structured radiation to form a combined beam.
6. Apparatus as in clause 4 wherein the module comprises a mode converter arranged to convert a polarization mode of the conditioning radiation to generate a beam including structured radiation having an inhomogeneous linear polarization.
7. Apparatus as in clause 6 wherein the mode converter is arranged receive the beam of conditioning radiation from the laser.
8. Apparatus as in clause 6 wherein the mode converter is arranged within an optical cavity of the laser.
9. Apparatus for determining an alignment state of a target of target material and a beam including conditioning radiation, the apparatus comprising:
   a first laser system configured to generate a beam of conditioning radiation;
   a second laser system configured to generate a beam of structured radiation having spatially inhomogeneous polarization distribution;
   a beam combiner arranged to receive and combine the beam of conditioning radiation and the beam of structured radiation to form a combined beam; and
   an analyzer arranged to receive radiation from the combined beam after the combined beam has interacted with the target and adapted to analyze a polarization of the combined beam.
10. Apparatus as in clause 9 wherein the first laser system configured to generate the beam of conditioning radiation comprises a pulsed laser.
11. Apparatus as in clause 9 wherein the second laser system configured to generate a beam of structured radiation comprises a continuous wave or quasi-continuous wave laser.
12. Apparatus as in clause 9 wherein the laser system configured to generate a beam of structured radiation comprises a continuous wave or quasi-continuous wave laser and a mode converter arranged to receive radiation from the continuous wave or quasi-continuous wave laser.
13. Apparatus for determining an alignment state of a target of target material and a beam of conditioning radiation, the apparatus comprising:
   a laser system configured to generate the beam of conditioning radiation propagating in a first direction;
   a mode converter arranged to receive the beam of conditioning radiation from the laser system and to convert a polarization mode of the conditioning radiation from the laser system to generate a beam of structured radiation propagating in the first direction;
   a beam splitter combiner arranged to receive the structured radiation after the beam of structured radiation has interacted with the target and to split the interacted radiation into at least a first beam and a second beam;
   an analyzer arranged to receive the first beam and adapted to analyze a polarization of the first beam to obtain a first portion of information describing a position of the target relative to the beam of conditioning radiation;
   a detector arranged to receive the second beam and adapted to use image information in the second beam to obtain a second portion of information describing a position of the target relative to the detector; and
   a system arranged to receive the first portion of information and the second portion of information and the adapted to obtain a position of the target relative to the beam of conditioning radiation based on the first portion of information and the second portion of information.
14. Apparatus for determining an alignment state of a target of target material and a beam of conditioning radiation, the apparatus comprising:
   a laser system configured to generate the beam of conditioning radiation, the laser system including a mode conversion means arranged to receive the conditioning radiation from the laser system and to convert a vector polarization mode of the conditioning radiation and a vortex polarization mode of the conditioning radiation to obtain a structured radiation beam having an inhomogeneous vector polarization and an inhomogeneous vortex polarization; and
   an analyzer arranged to receive the structured radiation beam after the structured radiation beam has interacted with the target and adapted to analyze a polarization orientation of the scattered structured radiation and the handedness of the vortex polarization of the scattered structured radiation to obtain a position of the target relative to the beam of conditioning radiation.
15. A method of aligning a target with a beam of conditioning radiation, the method comprising:
   using a laser system to generate the beam of conditioning radiation;

adding structured radiation having a spatially inhomogeneous polarization distribution to the beam of conditioning radiation;

causing the beam of conditioning radiation with structured radiation to strike and interact with the target to generate interacted radiation; and analyzing the interacted radiation to determine an alignment state of the target and the conditioning beam.

16. The method as in clause 15 further comprising controlling an alignment of the beam of conditioning radiation with structured radiation with the target based on the alignment state determined by analyzing the interacted radiation.

17. A method of aligning a target with a conditioning beam, the method comprising:

generating a conditioning beam travelling in a first direction;

generating a metrology beam;

converting the metrology beam to a structured metrology beam having structured radiation;

combining the conditioning beam and the structured metrology beam into a combined beam travelling in the first direction;

causing the combined beam to strike and interact with the target to generate interacted radiation; and analyzing the interacted radiation to determine an alignment state of the target and the conditioning beam.

18. The method as in clause 17 wherein generating a conditioning beam comprises using a laser to generate a pulsed beam.

19. The method as in clause 17 wherein generating a metrology beam comprises using a continuous wave or quasi-continuous wave laser to generate a continuous or quasi-continuous beam.

20. A method of aligning a target with a conditioning beam, the method comprising:

generating a conditioning beam;

converting the conditioning beam by changing a polarization mode of the conditioning beam by entangling one or more spatial polarization distributions with one or more spatial modes of the conditioning beam in a spatially inhomogeneous manner to obtain a structured beam;

causing the structured beam to strike and interact with the target to generate a beam of interacted radiation;

splitting the beam of interacted radiation into at least a first beam and a second beam;

obtaining image data from the first beam;

obtaining polarization data of the second beam;

using the image data and the polarization data to determine an alignment of the conditioning beam and the target.

21. A method of aligning a target with a conditioning beam, the method comprising:

generating a conditioning beam;

in any order, performing a vector polarization conversion on the conditioning beam and performing a vortex polarization on the conditioning beam to obtain a structured beam having an inhomogeneous vector polarization and an inhomogeneous vortex polarization;

causing the interacted beam to strike and interact with the target to generate a beam of interacted radiation;

in any order or concurrently, performing an analysis of a vector polarization of the interacted beam and a vortex polarization of the interacted beam;

determining an alignment of the beam and the target from the analysis.

The invention claimed is:

1. Apparatus for aligning a target of target material and a beam of conditioning radiation, the apparatus comprising:

a source of structured conditioning radiation; and an analyzer arranged to receive a beam of the structured conditioning radiation produced from the beam of conditioning radiation after the beam of structured conditioning radiation has interacted with the target and adapted to analyze a polarization of the interacted structured conditioning radiation to determine an alignment of the target and the beam of structured conditioning radiation.

2. Apparatus as claimed in claim 1 further comprising an alignment system for controlling an alignment of the source of structured condition radiation and the target based at least in part on the alignment determined by the analyzer.

3. Apparatus as claimed in claim 2 wherein the alignment system comprises a beam steering system.

4. Apparatus as claimed in claim 1 wherein the source of structured conditioning radiation comprises a laser system comprising a laser configured to generate the beam of conditioning radiation and a module arranged to receive the beam of conditioning radiation and configured to add structured radiation having a spatially inhomogeneous polarization distribution to the beam of conditioning radiation.

5. Apparatus as claimed in claim 4 wherein the module comprises a metrology laser system configured to generate a beam of structured radiation having a spatially inhomogeneous polarization distribution and a beam combiner arranged to receive and combine the beam of conditioning radiation and the beam of structured radiation to form a combined beam.

6. Apparatus as claimed in claim 4 wherein the module comprises a mode converter arranged to convert a polarization mode of the conditioning radiation to generate a beam including structured radiation having an inhomogeneous linear polarization.

7. Apparatus as claimed in claim 6 wherein the mode converter is arranged receive the beam of conditioning radiation from the laser.

8. Apparatus as claimed in claim 6 wherein the mode converter is arranged within an optical cavity of the laser.

9. Apparatus for determining an alignment state of a target of target material and a beam including conditioning radiation, the apparatus comprising:

a first laser system configured to generate a beam of conditioning radiation;

a second laser system configured to generate a beam of structured radiation having spatially inhomogeneous polarization distribution;

a beam combiner arranged to receive and combine the beam of conditioning radiation and the beam of structured radiation to form a combined beam; and an analyzer arranged to receive radiation from the combined beam after the combined beam has interacted with the target and adapted to analyze a polarization of the combined beam.

10. Apparatus as claimed in claim 9 wherein the first laser system configured to generate the beam of conditioning radiation comprises a pulsed laser.

11. Apparatus as claimed in claim 9 wherein the second laser system configured to generate a beam of structured radiation comprises a continuous wave or quasi-continuous wave laser.

12. Apparatus as claimed in claim 9 wherein the laser system configured to generate a beam of structured radiation comprises a continuous wave or quasi-continuous wave laser and a mode converter arranged to receive radiation from the continuous wave or quasi-continuous wave laser.

13. Apparatus for determining an alignment state of a target of target material and a beam of conditioning radiation, the apparatus comprising:

a laser system configured to generate the beam of conditioning radiation propagating in a first direction;

a mode converter arranged to receive the beam of conditioning radiation from the laser system and to convert a polarization mode of the conditioning radiation from the laser system to generate a beam of structured radiation propagating in the first direction;

a beam splitter [combiner] arranged to receive the structured radiation after the beam of structured radiation has interacted with the target and to split the interacted radiation into at least a first beam and a second beam;

an analyzer arranged to receive the first beam and adapted to analyze a polarization of the first beam to obtain a first portion of information indicative of a position of the target relative to the beam of conditioning radiation;

a detector arranged to receive the second beam and adapted to use image information in the second beam to obtain a second portion of information indicative of a position of the target relative to the detector; and a system arranged to receive the first portion of information and the second portion of information and the adapted to obtain a position of the target relative to the beam of conditioning radiation based on the first portion of information and the second portion of information.

14. Apparatus as claimed in claim 13 wherein the first portion of information is subject to an ambiguity as to the position of the target relative to the beam of conditioning radiation and wherein the system is adapted to use the second portion of radiation to resolve the ambiguity.

15. Apparatus as claimed in claim 13 wherein the analyzer analyzes a polarization angle and a degree of polarization of the first beam.

16. Apparatus as claimed in claim 13 wherein the detector comprises an array detector.

17. Apparatus for determining an alignment state of a target of target material and a beam of conditioning radiation, the apparatus comprising:

a laser system configured to generate the beam of conditioning radiation, the laser system including a mode conversion means arranged to receive the conditioning radiation from the laser system and to convert a vector polarization mode of the conditioning radiation and a vortex polarization mode of the conditioning radiation to obtain a structured radiation having an inhomogeneous vector polarization and an inhomogeneous vortex polarization; and an analyzer arranged to receive the structured radiation after the structured radiation has interacted with the target and adapted to analyze the structured radiation after the structured radiation has interacted with the target and a vortex polarization of the structured radiation after the structured radiation has interacted with the target to obtain a position of the target relative to the beam of conditioning radiation.

18. Apparatus as claimed in claim 17 wherein the analyzer is adapted to analyze a polarization orientation of the structured radiation after the structured radiation has interacted with the target.

19. Apparatus as claimed in claim 17 wherein the analyzer is adapted to analyze a handedness of the vortex polarization of the structured radiation after the structured radiation has interacted with the target.

20. Apparatus as claimed in claim 17 wherein the analyzer is adapted to analyze a polarization orientation and a handedness of the vortex polarization of the structured radiation after the structured radiation has interacted with the target.

* * * * *